United States Patent
Allison et al.

(10) Patent No.: US 10,181,599 B2
(45) Date of Patent: Jan. 15, 2019

(54) MICROWAVE DRYING OF LITHIUM-ION BATTERY MATERIALS

(71) Applicant: A123 Systems, LLC, Waltham, MA (US)

(72) Inventors: Chad Allison, South Lyon, MI (US); Iftikhar Ahmad, Raleigh, NC (US)

(*) Notice: Subject to any disclaimer, the term of this patent is extended or adjusted under 35 U.S.C. 154(b) by 0 days.

(21) Appl. No.: 14/385,761

(22) PCT Filed: Mar. 14, 2013

(86) PCT No.: PCT/US2013/031320
§ 371 (c)(1),
(2) Date: Sep. 16, 2014

(87) PCT Pub. No.: WO2013/138588
PCT Pub. Date: Sep. 19, 2013

(65) Prior Publication Data
US 2015/0074988 A1    Mar. 19, 2015

Related U.S. Application Data

(60) Provisional application No. 61/611,716, filed on Mar. 16, 2012.

(51) Int. Cl.
*H01M 4/1391* (2010.01)
*H01M 4/133* (2010.01)
(Continued)

(52) U.S. Cl.
CPC .......... *H01M 4/1391* (2013.01); *F26B 3/347* (2013.01); *F26B 13/10* (2013.01); *F26B 21/14* (2013.01);
(Continued)

(58) Field of Classification Search
CPC .......................... H01M 4/0402; H01M 4/1391
See application file for complete search history.

(56) References Cited

U.S. PATENT DOCUMENTS 3,528,179 A * 9/1970 Smith ....................... F26B 3/08
                                                        159/3
4,718,176 A * 1/1988 Clerici ..................... H01M 4/23
                                                       205/57
(Continued)

FOREIGN PATENT DOCUMENTS

CN    101090151 A    12/2007
JP    2003208924 A    7/2003
(Continued)

OTHER PUBLICATIONS

Machine translation JP2012-022858 (Year: 2012).*
(Continued)

*Primary Examiner* — Miriam Stagg
*Assistant Examiner* — Victoria H Lynch
(74) *Attorney, Agent, or Firm* — McCoy Russell LLP

(57) ABSTRACT

A method for making a lithium-ion cell includes depositing an electrode material as a coating on a substrate of the lithium-ion cell, irradiating the deposited electrode material with microwave radiation of varying frequency, wetting the irradiated electrode material with a non-aqueous electrolyte solution, and sealing the wetted electrode material in an air-tight enclosure.

17 Claims, 7 Drawing Sheets

(51) Int. Cl.

| | | |
|---|---|---|
| *H01M 10/0525* | (2010.01) | |
| *F26B 3/347* | (2006.01) | |
| *H01M 4/04* | (2006.01) | |
| *H01M 4/131* | (2010.01) | |
| *H01M 4/1393* | (2010.01) | |
| *H01M 4/505* | (2010.01) | |
| *H01M 4/525* | (2010.01) | |
| *H01M 4/587* | (2010.01) | |
| *H01M 4/66* | (2006.01) | |
| *H01M 10/04* | (2006.01) | |
| *H01M 10/0568* | (2010.01) | |
| *H01M 10/0569* | (2010.01) | |
| *H01M 10/058* | (2010.01) | |
| *F26B 13/10* | (2006.01) | |
| *F26B 21/14* | (2006.01) | |

(52) U.S. Cl.
CPC ....... *H01M 4/0402* (2013.01); *H01M 4/0404* (2013.01); *H01M 4/0419* (2013.01); *H01M 4/131* (2013.01); *H01M 4/133* (2013.01); *H01M 4/1393* (2013.01); *H01M 4/505* (2013.01); *H01M 4/525* (2013.01); *H01M 4/587* (2013.01); *H01M 4/661* (2013.01); *H01M 10/0404* (2013.01); *H01M 10/058* (2013.01); *H01M 10/0525* (2013.01); *H01M 10/0568* (2013.01); *H01M 10/0569* (2013.01); *Y10T 29/4911* (2015.01)

(56) References Cited

U.S. PATENT DOCUMENTS

| | | | |
|---|---|---|---|
| 5,462,820 A | 10/1995 | Tanaka | |
| 5,654,114 A | 8/1997 | Kubota et al. | |
| 5,792,574 A | 8/1998 | Mitate et al. | |
| 5,985,488 A | 11/1999 | Mitate et al. | |
| 6,152,971 A | 11/2000 | Miyanowaki et al. | |
| 6,162,264 A | 12/2000 | Miyazaki et al. | |
| 6,306,215 B1 * | 10/2001 | Larkin .................... | B05C 1/083 118/249 |
| 6,998,191 B2 | 2/2006 | Shindo et al. | |
| 7,081,320 B2 | 7/2006 | Kawakami et al. | |
| 7,135,253 B2 | 11/2006 | Nakagawa et al. | |
| 7,303,594 B2 | 12/2007 | Cintra et al. | |
| 7,378,189 B2 | 5/2008 | Hagiwara et al. | |
| 7,615,313 B2 | 11/2009 | Hagiwara et al. | |
| 7,640,150 B2 | 12/2009 | Hagiwara et al. | |
| 7,851,087 B2 | 12/2010 | Miyamoto et al. | |
| 7,854,773 B2 | 12/2010 | Tsunekawa et al. | |
| 2003/0087158 A1 * | 5/2003 | Nakagawa ............ | H01M 2/145 429/255 |
| 2005/0031961 A1 | 2/2005 | Tsunekawa et al. | |
| 2005/0130039 A1 | 6/2005 | Shimizu et al. | |
| 2006/0141138 A1 | 6/2006 | Hamrock et al. | |
| 2007/0215612 A1 * | 9/2007 | Hicks ...................... | H05B 6/74 219/746 |
| 2008/0131782 A1 | 6/2008 | Hagiwara et al. | |
| 2008/0184918 A1 * | 8/2008 | Kim ......................... | B09B 3/00 110/255 |
| 2009/0110992 A1 | 4/2009 | Nguyen | |
| 2009/0211522 A1 * | 8/2009 | Perl ..................... | H01M 8/0234 118/642 |
| 2010/0206363 A1 | 8/2010 | Choi | |
| 2011/0204548 A1 * | 8/2011 | George .................. | F26B 3/347 264/638 |
| 2013/0266741 A1 * | 10/2013 | Song ..................... | H01M 4/131 427/559 |

FOREIGN PATENT DOCUMENTS

| | | |
|---|---|---|
| JP | 2008103098 A | 5/2008 |
| JP | 2010108624 A | 5/2010 |
| JP | 2010113874 A | 5/2010 |
| JP | 2011082059 A | 4/2011 |
| JP | 2012022858 A | 2/2012 |
| JP | 2012033364 A | 2/2012 |

OTHER PUBLICATIONS

Korean Intellectual Property Office, International Search Report of PCT/US2013/031320, dated Jun. 25, 2013, WIPO, 3 pages.
Japan Patent Office, Office Action Issued in Application No. 2015-500609, dated Oct. 24, 2016, 9 pages.
State Intellectual Property Office of the People's Republic of China, Office Action and Search Report Issued in Application No. 201380025263.1, dated Apr. 6, 2016, 11 pages. (Submitted with Partial Translation).
State Intellectual Property Office of the People's Republic of China, Office Action Issued in Application No. 201380025263.1, dated Aug. 7, 2017, 6 pages. (Submitted with Partial Translation).

* cited by examiner

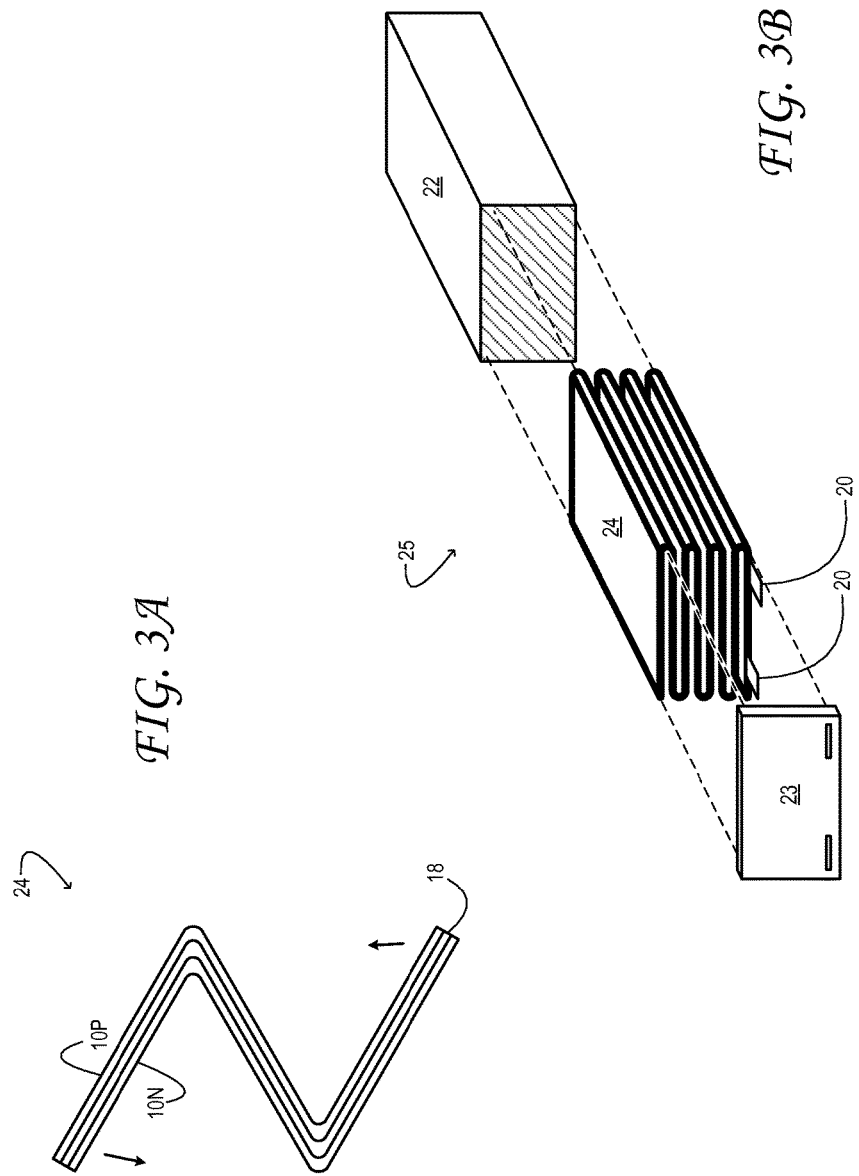

MICROWAVE DRYING OF LITHIUM-ION BATTERY MATERIALS

CROSS REFERENCE TO RELATED APPLICATIONS

This application is the United States National Phase of International Patent Application Serial No. PCT/US2013/031320, entitled "Microwave Drying of Lithium-Ion Battery Materials," filed Mar. 14, 2013, which claims priority to U.S. Provisional Patent Application No. 61/611,716, entitled "Microwave Drying of Lithium-Ion Battery Materials," filed Mar. 16, 2012, the entire contents of each of which are hereby incorporated by reference in their entirety for all purposes.

TECHNICAL FIELD

This disclosure relates to the fabrication of lithium-ion batteries, and more particularly, to using microwave radiation to desiccate electrode materials for use in a lithium-ion battery.

BACKGROUND AND SUMMARY

Each cell of a lithium-ion battery includes a negative electrode and a positive electrode. The negative electrode may consist of a lithium-ion intercalated, reduced-carbon material dispersed on a copper or nickel substrate. The positive electrode may consist of a lithium metal oxide dispersed on an aluminum substrate. The positive and negative electrodes may be arranged in layers, with an insulating separator placed between them to prevent short circuit. The resulting layered structure may be folded or wound into the desired cell configuration, connected to the external contacts of the cell, wetted with a non-aqueous electrolyte solution, and then sealed in a suitable enclosure.

Generally speaking, the performance and longevity of a lithium-ion cell may depend on the degree to which moisture—viz., water—is excluded from the materials sealed in the cell enclosure. Accordingly, the positive and negative electrode layers may be heated under vacuum to desiccate the electrode materials prior to addition of the electrolyte solution. However, vacuum treatment is costly and time-consuming, and is not easily applicable to continuous—e.g., roll-to-roll processing.

Accordingly, one embodiment of this disclosure provides a method for making a lithium-ion cell. The method includes depositing an electrode material as a coating on a substrate of the lithium-ion cell, irradiating the deposited electrode material with microwave radiation of varying frequency, wetting the irradiated electrode material with a non-aqueous electrolyte solution, and sealing the wetted electrode material in an air-tight enclosure. Another embodiment provides an apparatus for making a lithium-ion cell. The apparatus includes an electrode-material deposition stage, a microwave desiccation stage, a wetting stage, and a sealing stage. The deposition stage is configured to deposit an electrode material as a coating on a substrate of the lithium-ion cell. The desiccation stage includes a microwave emitter configured to irradiate the deposited electrode material with microwave radiation of varying frequency. The wetting stage is configured to wet the irradiated electrode material with a non-aqueous electrolyte solution. The sealing stage is configured to seal the wetted electrode material in an air-tight enclosure.

The statements above are provided to introduce a selected part of this disclosure in simplified form, not to identify key or essential features. The claimed subject matter, defined by the claims, is limited neither to the content above nor to implementations that address any problems or disadvantages referenced herein.

BRIEF DESCRIPTION OF THE DRAWINGS

FIG. 3A shows positive and negative electrodes as arranged for use in a flat-pack lithium-ion cell, in accordance with an embodiment of this disclosure.

FIG. 3B shows a flat-pack lithium-ion cell in accordance with an embodiment of this disclosure.

DETAILED DESCRIPTION

Figure 1A:
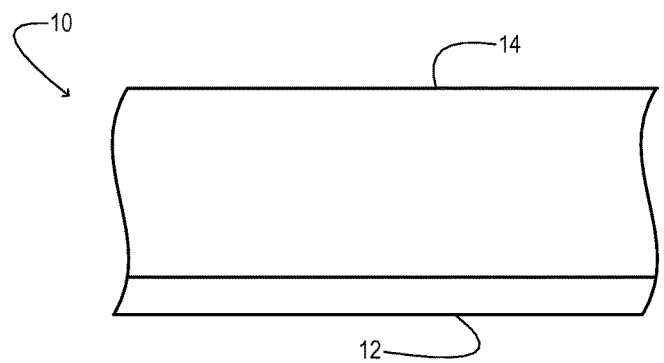
FIGS. 1A and 1B show aspects of lithium-ion cell electrodes in cross section, in accordance with embodiments of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1A schematically shows a lithium-ion cell electrode 10 in cross section. The electrode includes a substrate 12 and an electroactive coating 14 supported on the substrate. In general, electrode 10 may be the positive electrode 10P or the negative electrode 10N of the cell. The electroactive coating of the positive electrode may comprise a lithium metal oxide such as lithium cobaltate, lithium manganate, lithium nickelate, or lithium nickel cobaltate, to name only a few. The substrate of the positive electrode may be aluminum foil. The electroactive coating of the negative electrode may comprise any form of lithium-intercalated carbon, including lithium-intercalated graphite. The substrate of the negative electrode may be copper or nickel foil. In some embodiments, either or both of the electroactive coatings may be applied from an aqueous or non-aqueous slurry to the corresponding substrate, thereby imparting a significant quantity of water to the electrodes. Further, either or both of the electrodes may include other materials as well, such as binders or adhesives, which may also contain water and/or other protic compounds.

Figure 1B:
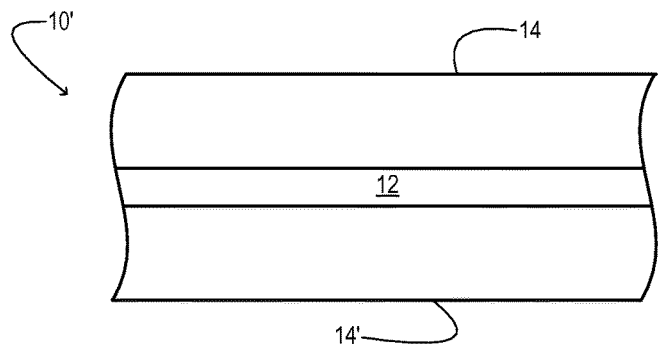

Although FIG. 1A shows an electrode coated on only one side of the substrate, electrodes coated on both sides are fully consistent with this disclosure and fully applicable to the methods set forth hereinafter. Accordingly, FIG. 1B shows an electrode 10' having a substrate 12 coated on both sides with electroactive coatings 14 and 14'. In such embodiments, the coating on one side may be the same or at least somewhat different than the coating on the other side.

Figure 2A:
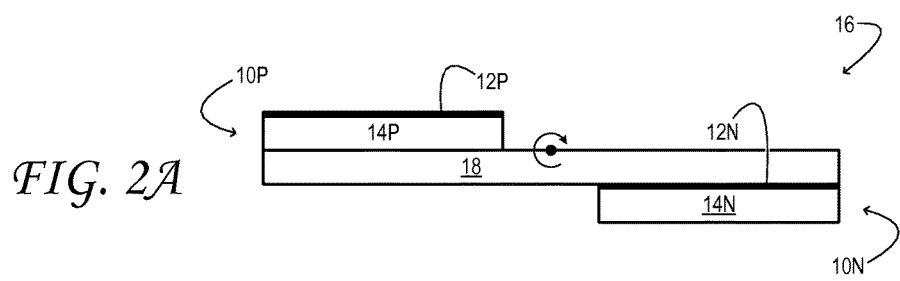
FIG. 2A shows positive and negative electrodes as arranged for use in a cylindrical lithium-ion cell, in accordance with an embodiment of this disclosure.
Figure 2B:
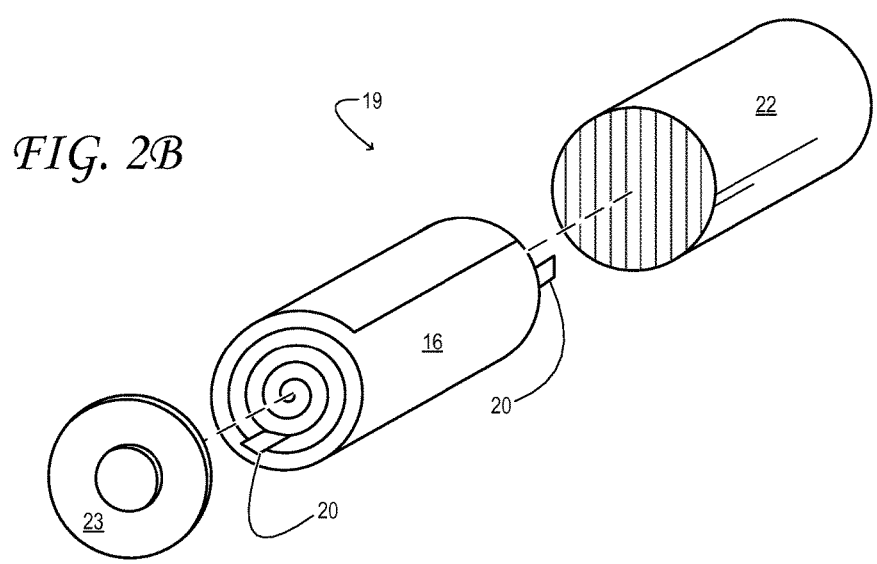
FIG. 2B shows aspects of a cylindrical lithium-ion cell in accordance with an embodiment of this disclosure.

As shown in FIG. 2A, positive electrode 10P and negative electrode 10N may be rolled up into a 'jellyroll' structure 16 for use in a cylindrical lithium-ion cell. In this embodiment, the electrodes are layered and wound with a porous separator sheet 18 arranged between them, to prevent short circuit. FIG. 2B shows an example cylindrical lithium-ion cell 19 with electrical contacts 20, an enclosure 22, and a sealing cap 23. The electrical contacts may be extensions of the substrates 12P and 12N of the positive and negative electrodes, respectively. In other embodiments, the positive and negative electrodes 10P and 10N, respectively, may be layered and folded into a 'flat-pack' structure 24, as in FIG. 3A, with a porous separator sheet 18 between them. The latter configuration may be used in a flat-pack lithium-ion cell 25, as shown in FIG. 3B.

To complete the lithium-ion cells, a non-aqueous electrolyte solution—e.g., a lithium salt dissolved in a polar aprotic solvent—is injected into the enclosure, which is then sealed. In some embodiments, the aprotic solvent may include one or more of ethylene carbonate, dimethylcarbonate, and diethylcarbonate. In these and other embodiments, the lithium salt may be a hygroscopic solid such as lithium hexafluorophosphate, lithium tetrafluoroborate, or lithium perchlorate.

Figure 4:
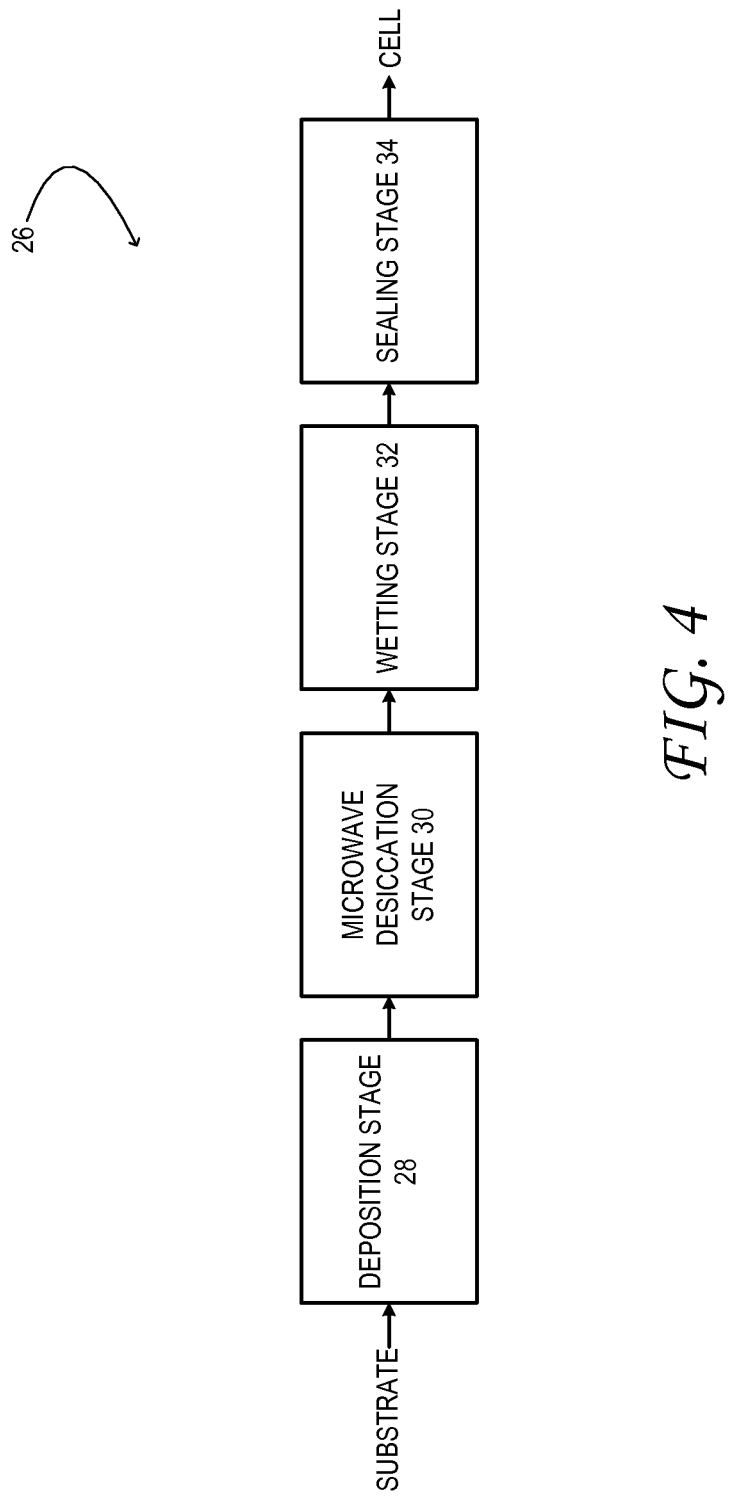
FIG. 4 is a block diagram that represents an apparatus for making a lithium-ion cell in accordance with an embodiment of this disclosure.

FIG. 4 is a high-level block diagram showing various stages of an apparatus 26 for making a lithium-ion cell, in one embodiment. The apparatus includes an electrode-material deposition stage 28, a microwave desiccation stage 30, a wetting stage 32, and a sealing stage 34. The deposition stage is configured to deposit an electrode material as a coating on a substrate 12 of the lithium-ion cell. The microwave desiccation stage is configured to irradiate the deposited electrode material with microwave radiation of varying frequency. In some embodiments, the microwave desiccation stage is configured to convey the electrode material and substrate as a continuous sheet. The wetting stage is configured to wet the irradiated electrode material with a non-aqueous electrolyte solution. The sealing stage is configured to seal the wetted electrode material in an airtight enclosure.

Figure 5:
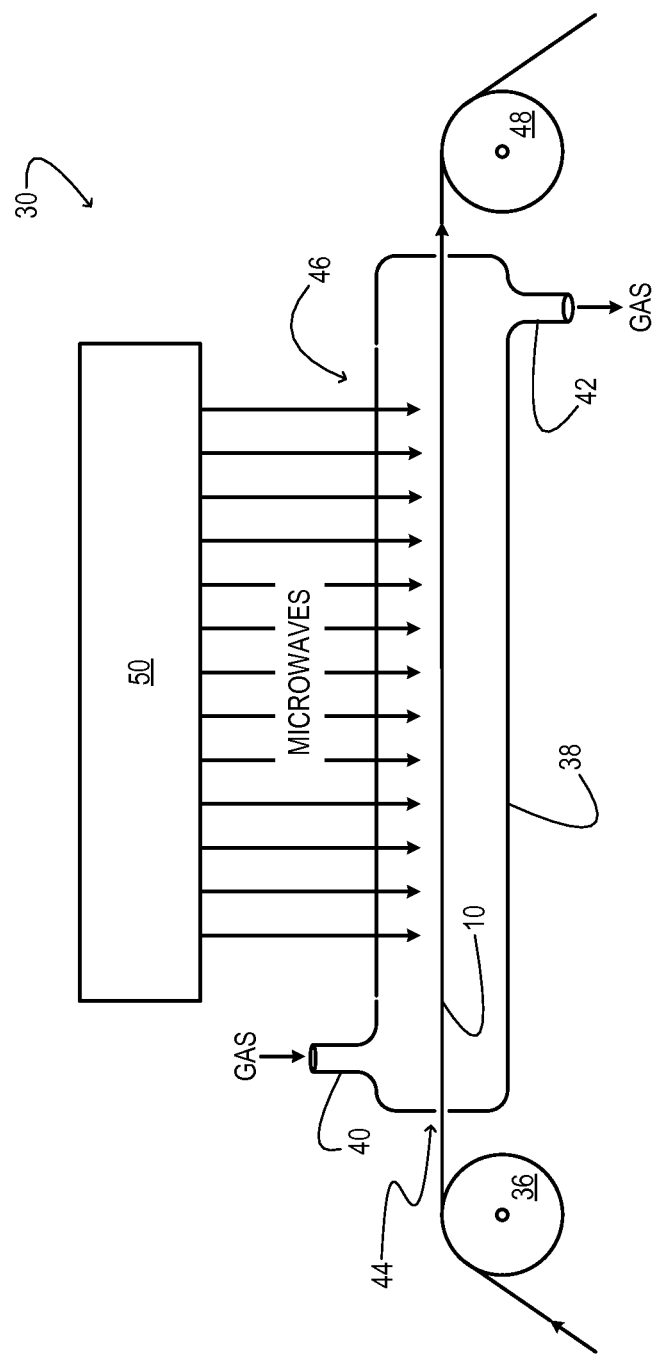
FIG. 5 shows aspects of a microwave desiccation stage of an apparatus for making a lithium-ion cell in accordance with an embodiment of this disclosure.

As noted above, the performance and longevity of a lithium-ion cell may depend on the degree to which moisture is excluded from the materials sealed in the cell enclosure. Accordingly, FIG. 5 shows aspects of an example microwave desiccation stage 30 in one embodiment. The illustrated microwave desiccation stage is configured to desiccate a continuous sheet of electrode material using variable-frequency microwave heating.

Microwave desiccation stage 30 includes feed roller 36, from which the material to be desiccated is fed in. In the illustrated embodiment, the electrode is fed into the microwave dessication stage as a continuous sheet. Accordingly, the feed roller may be configured to maintain a suitable amount of tension in the sheet. In one embodiment, the width of the sheet may be substantially the same as the width of an electrode in a finished lithium-ion cell. In some embodiments, the electrode material fed into the microwave desiccation stage may have the structure of positive electrode 10P or negative electrode 10N of the foregoing drawings; it may include an electroactive coating 14 arranged on a substrate 12. In other embodiments, the electrode material fed into the microwave desiccation stage may have a more complex, layered structure. For example, it may include both positive and negative electrode layers, and one or more separator sheets 18.

Continuing in FIG. 5, microwave desiccation stage 30 also includes gas conduit 38, which has an inlet 40, an outlet 42, and an opening 44 of appropriate dimensions to allow the electrode material to pass through. The gas conduit is configured to conduct a gas over the electrode material as the electrode material is being irradiated. At least an upper window 46 of the gas conduit may be made of a microwave-transmissive material, such as glass or ceramic. In principle, any dry, non-microwave absorbing gas may be admitted through inlet 40 and used to convey the humidity out of the gas conduit. Examples include nitrogen, argon, carbon dioxide, and de-humidified air.

Although a flow of gas may aid in the electrode drying process, it may not be necessary in all applications. Accordingly, gas conduit 38 may be omitted in some embodiments in favor of an open structure where the material to be desiccated is conveyed through an open space, and where the humidity is carried away by convection into the atmosphere. Microwave desiccation stage 30 also includes uptake roll 48, which is configured to draw the electrode material though the stage and to store the desiccated material for future use.

In microwave desiccation stage 30, the primary mode of desiccation of the electrode material is heating by absorption of microwave radiation. Accordingly, the apparatus includes microwave emitter 50, which is configured to direct its emission through gas conduit 38 and onto the material to be desiccated.

The inventor herein has discovered that fixed-frequency microwave irradiation may be disadvantageous for desiccating the electrode materials described herein. Without being bound by any particular theory, it is believed that fixed-frequency microwave irradiation causes nodal planes to build up in the irradiated space, which is problematic when the material to be desiccated includes a metal—e.g., the metal foil substrates 12. Nodal planes are believed to induce currents and charge localizations in and mostly on conductive objects. This can lead to non-uniform heating, arcing, and damage to the electrodes. However, by scanning the frequency—i.e., changing the frequency of the radiation over time—these nodal planes can be averted, allowing the electrode material to heat up more uniformly.

Accordingly, microwave emitter 50 may be a variable-frequency microwave emitter. In one embodiment, the frequency of the radiation available from the microwave emitter may be adjustable continuously from 1.0 gigahertz (GHz) to 8.0 GHz. In another embodiment, the frequency of the radiation may be adjustable over the same range in discrete steps. Thus, the frequency of the microwave emitter may be configured to ramp up or down as the electrode material is conveyed through the desiccation stage. In some embodiments, the varying frequency of the microwave radiation may be chosen to prevent nodal planes from forming along the electrode material. This feature may prevent undesirable effects especially when the substrate is a metal substrate irradiated along with the electrode material.

In one, non-limiting embodiment, the overall power output of the microwave emitter may be 10 kilowatts per square meter of irradiated electrode material. In other embodiments, the power may be greater. In single-electrode testing, a maximum power of 500 watts was used. It will be noted, however, that the numerical values and ranges set forth herein are examples only, and that other values and ranges are also contemplated.

The configurations described above enable various methods for making a lithium-ion cell. Accordingly, some such methods are now described, by way of example, with continued reference to the above configurations. It will be understood, however, that the methods here described, and others fully within the scope of this disclosure, may be enabled by other configurations as well. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 6:
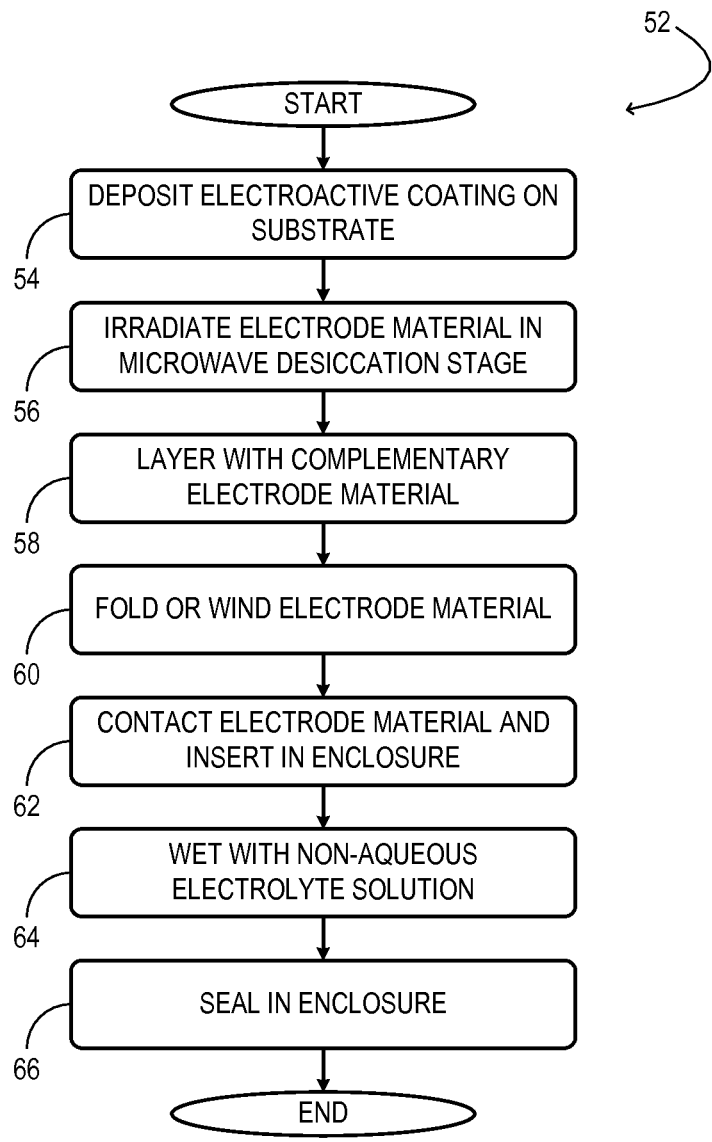
FIG. 6 illustrates an example method for making a lithium-ion cell in accordance with an embodiment of this disclosure.

FIG. 6 illustrates an example method 52 for making a lithium-ion cell in one embodiment. At 54 of method 52, an electroactive coating is deposited on a foil substrate to form the positive or negative electrode material of the cell, as described hereinabove. The substrate may be in the form of a continuous sheet. In one embodiment, the electroactive coating may be applied via a continuous spray-coating or transfer-coating process. In one embodiment, the electroactive coating may be applied from an aqueous or non-aqueous slurry.

At 56 the deposited electrode material is irradiated with microwave radiation in a microwave desiccation stage, such as microwave desiccation stage 30. In some embodiments, the electrode material may be pre-dried or partially dried in air prior to entering the microwave desiccation stage. At 58, the desiccated electrode material is layered with a complementary electrode material, which may also be desiccated by the same or a similar process. In one embodiment, the electrode materials may be layered together along with one or more separator layers, as described hereinabove. In other embodiments, the electrode material subject to microwave desiccation may include both positive and negative electrode materials deposited on their respective substrates, with a separator layer arranged between the positive and negative electrode materials.

At 60 the layered structure is folded or wound according to the desired final form of the lithium-ion cell. At 62, electrical connection is made to the electrode substrate materials via external contacts of the cell, and the layered structure is inserted into an enclosure. At 64, a non-aqueous electrolyte solution is added to the enclosure so that it wets the irradiated electrode material. At 66 the enclosure is sealed, making it airtight.

Figure 7:
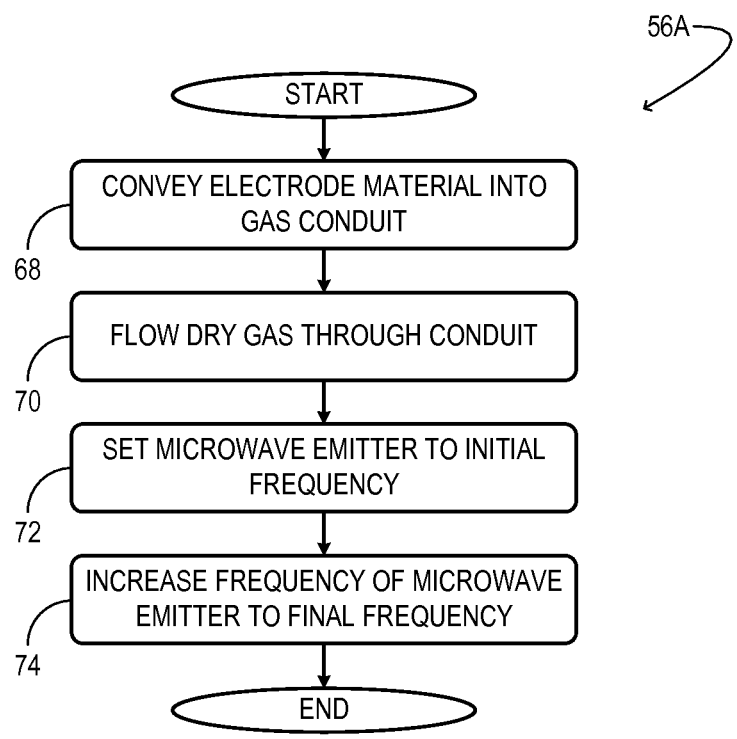
FIG. 7 illustrates an example method to irradiate electrode material in a microwave desiccation stage of an apparatus for making a lithium-ion cell, in accordance with an embodiment of this disclosure.

FIG. 7 illustrates an example method 56A to irradiate electrode material in a microwave desiccation stage of an apparatus for making a lithium-ion cell. Method 56A may be a more particular embodiment of block 56 of the foregoing method. However, method 56A may also be used independently.

At 68 of method 56A, the electrode material is conveyed into a gas conduit. In one embodiment, the electrode material may be conveyed from a feed roller to an uptake roller, through an opening of the gas conduit. At 70 a dry gas such as nitrogen, argon, carbon dioxide, or de-humidified air is flowed through the gas conduit from an inlet to an outlet. In other embodiments, forced gas flow may be omitted, as discussed hereinabove. At 72 the frequency of the microwave emitter is set to an initial frequency, which may be 1.0 GHz in some examples. At 74 the frequency of the microwave emitter is increased linearly to a final frequency. In one non-limiting example, the final frequency may be 8.0 GHz, and the ramping may take place over a period of 10 minutes. In one embodiment, the time period of the ramping may coincide with the time taken for a given portion of the electrode material to pass through the gas conduit or field of microwave irradiation from one end to the other. In another embodiment, the frequency may be ramped from the initial frequency to the final frequency and then back to the initial frequency in the time taken for one portion of the electrode material to pass from one end to the other.

Despite the numerous advantages of continuous—e.g., roll-to-roll processing of electrode materials for use in lithium-ion cells, this disclosure is also consonant with batch-type processing. In one example, individual, stamped electrodes may be irradiated with variable-frequency microwaves under flowing gas to effect desiccation. Furthermore, although water has been identified as the primary agent to be removed by microwave irradiation, this technique also bakes out other volatile components—e.g., residues of protic compounds besides water that may be introduced via the binders and/or adhesives used in cell fabrication.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A method for making a lithium-ion cell, the method comprising:
    depositing electrode materials including a positive electrode material and a negative electrode material as coatings on respective substrates of the lithium-ion cell, the substrates in the form of a continuous sheet;
    passing the deposited electrode materials through a microwave radiation field of varying frequency while flowing a gas over the deposited electrode materials to heat the electrode materials before winding or folding the electrode materials with one or more separator layers, wherein the frequency increases linearly from an initial frequency to a final frequency, the increasing coincident with a time taken for a given portion of the electrode material to pass through the field of microwave radiation;
    wetting the irradiated electrode materials with a non-aqueous electrolyte solution; and
    sealing the wetted electrode materials in an air-tight enclosure.

2. The method of claim 1 wherein the electrode materials include one or more of lithium cobaltate, lithium manganate, lithium nickelate, and lithium nickel cobaltate.

3. The method of claim 1 wherein the electrode materials include lithium-intercalated carbon.

4. The method of claim 1 wherein the one or more separator layers are arranged between the positive and negative electrode materials.

5. The method of claim 1 wherein the electrode materials are applied from an aqueous slurry.

6. The method of claim 1 wherein depositing the electrode materials includes spray coating and/or transfer coating the electrode materials onto the respective substrates.

7. The method of claim 1 wherein one or more of the respective substrates includes a metal foil.

8. The method of claim 1 wherein the non-aqueous electrolyte solution includes one or more of ethylene carbonate, dimethylcarbonate, and diethylcarbonate.

9. The method of claim 1 wherein the non-aqueous electrolyte solution includes a dissolved hygroscopic solid.

10. An apparatus for making a lithium-ion cell, the apparatus comprising:
    an electrode-material deposition stage configured to deposit an electrode material as a coating on a substrate of the lithium-ion cell;
    a desiccation stage including a microwave emitter, a feed roller feeding the deposited electrode material as a continuous sheet to the desiccation stage, and a gas conduit with an inlet and an outlet, wherein the deposited electrode material is continuously irradiated with microwave radiation of an output power while ramping a frequency from a first frequency to a final frequency while passing through the gas conduit, wherein a gas is conducted through the gas conduit from the inlet to the outlet, and the feed roller is configured to maintain a suitable amount of tension in the sheet;
    a wetting stage configured to wet the irradiated electrode material with a non-aqueous electrolyte solution; and
    a sealing stage configured to seal the wetted electrode material in an air-tight enclosure.

11. The apparatus of claim 10 wherein the desiccation stage is configured to convey the electrode material and substrate as a continuous sheet.

12. The apparatus of claim 10 wherein the gas conduit includes a glass or ceramic window permeable to microwave radiation.

13. The apparatus of claim 10 wherein the ramped frequency of the microwave emitter is adjustable between 1 and 8 gigahertz.

14. The apparatus of claim 10 wherein a power of the microwave emitter is ten kilowatts per square meter or greater.

15. The apparatus of claim 14 wherein the ramped frequency of the microwave emitter is configured to ramp up or down as the electrode material is conveyed through the desiccation stage while the power of the microwave emitter is ten kilowatts per square meter or greater.

16. A method for making a lithium-ion cell, the method comprising:
    depositing an electrode material as a coating on a substrate of the lithium-ion cell, the substrate in the form of a continuous sheet;
    passing the deposited electrode material through a field of microwave irradiation, wherein the deposited electrode material is continuously irradiated with microwave radiation linearly increased from an initial frequency to a final frequency, the initial frequency and the final frequency chosen for a threshold output power and further to prevent nodal planes from forming along the electrode material, wherein the increasing coincides with a time taken for a given portion of the electrode material to pass through the field of microwave irradiation, wherein a feed roller for feeding the deposited electrode material through the field of microwave irradiation is configured to maintain a suitable amount of tension in the sheet;
    folding or winding the electrode material with one or more separator layers;
    wetting the irradiated electrode material with a non-aqueous electrolyte solution; and
    sealing the wetted electrode material in an air-tight enclosure.

17. The method of claim 16 wherein the substrate includes a metal, which is irradiated along with the electrode material.

* * * * *